United States Patent
Bruno (10) Patent No.: US 8,548,322 B2
(45) Date of Patent: Oct. 1, 2013

(54) CHANNEL POWER ESTIMATION MEANS

(75) Inventor: Gianmarco Bruno, Genoa (IT)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 429 days.

(21) Appl. No.: 12/866,890

(22) PCT Filed: Feb. 29, 2008

(86) PCT No.: PCT/EP2008/052539
§ 371 (c)(1),
(2), (4) Date: Nov. 1, 2010

(87) PCT Pub. No.: WO2009/106147
PCT Pub. Date: Sep. 3, 2009

(65) Prior Publication Data
US 2011/0058808 A1    Mar. 10, 2011

(51) Int. Cl.
*H04B 10/08*    (2011.01)
(52) U.S. Cl.
USPC ............... 398/38; 398/25; 398/34; 398/94; 398/197
(58) Field of Classification Search
USPC ............... 398/25, 34, 38, 94, 197; 359/334, 359/337.1
See application file for complete search history.

(56) References Cited

U.S. PATENT DOCUMENTS

| | | | | |
|---|---|---|---|---|
| 5,909,305 A | * | 6/1999 | Kinoshita | 359/337.1 |
| 6,111,676 A | * | 8/2000 | Lemus et al. | 398/1 |
| 6,304,324 B1 | | 10/2001 | Iwasaki | |
| 7,242,863 B2 | * | 7/2007 | DeGrange, Jr. | 398/30 |
| 7,280,762 B1 | | 10/2007 | Haggans et al. | |
| 2003/0151799 A1 | | 8/2003 | Wight et al. | |
| 2004/0246466 A1 | | 12/2004 | Hunsche | |
| 2004/0264957 A1 | | 12/2004 | Ng et al. | |
| 2006/0001950 A1 | * | 1/2006 | Fujimura et al. | 359/334 |
| 2006/0083385 A1 | * | 4/2006 | Allamanche et al. | 381/23 |

FOREIGN PATENT DOCUMENTS

| | | |
|---|---|---|
| CN | 1741434 A | 3/2006 |
| WO | 98/54862 A1 | 12/1998 |
| WO | 02/091646 A1 | 11/2002 |
| WO | 03/025630 A2 | 3/2003 |

OTHER PUBLICATIONS

PCT International Search Report, mailed Oct. 31, 2008, in connection with International Application No. PCT/EP2008/052539.

* cited by examiner

*Primary Examiner* — Li Liu
(74) *Attorney, Agent, or Firm* — Potomac Patent Group PLLC (57) ABSTRACT

A channel power estimator for estimating the power of each channel in a wavelength division multiplexed (WDM) signal, comprising filter means to select and output a sub-band of an incoming WDM signal, function application means to apply a weighting function at least once to the output from the filter means and then output the weighted signal to reconstruction means, storage means for storing optical characteristic data on at least the function application means, wherein the reconstruction means calculates an estimation of the power distribution of the incoming WDM signal using the weighted signal and the optical characteristic data.

14 Claims, 5 Drawing Sheets

CHANNEL POWER ESTIMATION MEANS

This invention relates to a channel power estimation means for estimating the power of a channel and its associated method of operation. In particular, it relates to a channel power estimation means for the detection of active optical channels and the estimation of the power of optical channels in a wavelength division multiplexed (WDM) optical communications network.

Devices and methods are known for detecting the presence and estimating the power of an active optical channel in a WDM network. Typically many signal quality monitors (SQMs) are deployed throughout the links of the network. SQMs are expensive and therefore the set-up cost of the network can be high if SQMs are used extensively. This is particularly costly for optical networks that use only a few channels. It is essential to measure the signal quality in an optical network as otherwise the network will be unreliable and less resilient to changes in data traffic loads, for example. In particular, the monitoring of active channels allows the number of channels in use and their spectral allocation to be determined so that optical amplifiers, for example, can be set correctly. The detection of active channels and power levels can also be used with other measurements for signal conditioning such as pre-distortion, pre-emphasis and optical and electrical post-processing.

There are two main categories that known methods of channel detection and analysis fall in to. Firstly, those that use a narrowband tuneable optical filter that selects a portion of the spectrum that is of interest combined with a single photodetector. Secondly, those that use a set of photodetectors that detect, in parallel, the composite optical signal once it has been pre-processed by a Fibre Bragg Grating (FBG) or Arrayed Waveguide Gratings (AWG), for example.

US 2004/0246466 discloses a method and apparatus for channel detection. The device described performs presence detection of optical channels over the whole transmission bandwidth. A delay line and a phase control means are used to detect the presence or absence of a channel. The device is unable to count the number of channels or estimate the signal strength.

WO 2003/025630 discloses channel detection means that decomposes the incoming WDM signal into its constituent parts. The device uses an array of photodetectors (one for each channel to be monitored) and a high-precision servo-controlled mechanism to maintain a diffraction grating in its optimal position.

CN1741434 discloses a means that decomposes the incoming WDM signal into its constituent parts by a cascade of power splitters and optical filters. However, this device is expensive to implement as it requires, for a system having N channels, an array of N photodetectors, N analogue to digital converters and (N−1) optical filters.

U.S. Pat. No. 6,304,324 discloses a system that employs a single photodetector but requires a shaped surface acting as a diffraction grating, a motor to rotate the grating to the desired angle and two concave mirrors for focussing the light beams.

According to a first aspect of the present invention we provide channel power estimation means for estimating the power of each channel in a wavelength division multiplexed (WDM) signal, comprising filter means adapted to select and output a sub-band of an incoming WDM signal, function application means adapted to apply a weighting function at least once to the output from the filter means and then output the weighted signal to reconstruction means, storage means for storing optical characteristic data on at least the function application means, wherein the reconstruction means calculates an estimation of the power distribution of the incoming WDM signal using the weighted signal and the optical characteristic data.

This is advantageous as the filter means and function application means are inexpensive optical components that, in combination with the microprocessor, allow the channel power estimation means to extract accurate results of the power distribution of a WDM signal. Further, as the optical characteristic data is pre-programmed and stored in the storage means, the calculations required to be done by the reconstruction means are minimal.

Preferably, the sub-band comprises a sub-set of the channels present in the incoming signal. This is advantageous as by selecting some but not all of the channels using the filter means, accurate results can be obtained.

Preferably the filter means comprises an optical filter. Preferably the filter means is adapted to select a different sub-band of the incoming signal after the initially selected sub-band. Alternatively the filter means selects and outputs different sub-bands of the incoming signal simultaneously. In this case, the channel power estimation means preferably includes an optical switch adapted to select one of the sub-bands output from the filter means and pass it to the function application means.

Preferably the reconstruction means comprises a microprocessor. Preferably the reconstruction means is arranged to control the sub-band that the filter means selects. Preferably the reconstruction means is arranged to control the function application means such that the function application means applies the weighting function a predetermined number of times. Preferably, reconstruction means is adapted to cause the function application means apply the weighting function M times wherein M is greater or equal to the number of channels N contained in the sub-band. Preferably, the storage means stores the value of M. Thus, M is predetermined during the design stage and is based on the calibration of the filter means and to maximise accuracy.

Preferably, the function application means comprises an optical component whose transfer function can be changed according to a control parameter and is preferably invertible. Preferably, the function application means comprises an optical attenuator with variable tilt. Preferably the reconstruction means is adapted to control the function application means such that the function application means applies the weighting function a predetermined number of times and is adapted to change the control parameter each time the function application means applies the weighting function to the sub-band. Preferably the weighting function is changed each time it is applied to the sub-band such that a different pattern of amplification and/or attenuation is applied to the sub-band. Preferably, the different weighting functions are chosen such that the condition number of the resulting weighting function is minimized. This is advantageous as the closer to the minimum condition number the more accurate the results obtained by the channel power estimation means 1.

Preferably the channel power estimation means includes a photodiode that is arranged to receive the optical signal from the function application means and is adapted to convert it to an electrical signal for receipt by an analogue-to-digital convertor arranged between the photodiode and the microprocessor.

Preferably optical characteristic data on at least the function application means is stored in the storage means as a matrix. Preferably the optical characteristic data also incorporates optical characteristic details of the filter means. Preferably the storage means is preprogrammed with the optical characteristic data.

According to a second aspect of the present invention we provide a method for estimating the power distribution of an incoming wavelength division multiplexed (WDM) signal, the method comprising the steps of;
(a) selecting a sub-band from the incoming signal;
(b) applying a weighting function to the selected sub-band to generate a weighted signal;
(c) measuring the power of the weighted signal;
(d) modifying the weighting signal and repeating steps (b) and (c) until the weighting functions have been applied a predetermined number of times;
(e) calculating an estimation of the power distribution of the sub-band using the measurements of the weighted signal and details of the weighting function;
(f) selecting a different sub-band from the incoming signal and repeating steps (b) and (c) until all of the sub-bands of the incoming signal have been selected.

Preferably the method includes a step (g) involving compiling the estimation of the power distribution of each sub-band and outputting a signal indicative of the power of each channel in the incoming signal.

Preferably the weighting function is applied to the sub-band M times wherein M is greater or equal to the number of channels $N_B$ contained in the sub-band. Most preferably the weighting function is applied to the sub-band $N_B$ times where $N_B$ is the number of channels contained in the sub-band.

Preferably step (e) involves multiplying each of the measured weighted signals by an inverse matrix of the weighting function. This is advantageous as the calculations performed are simple yet the estimations of each of the channel powers are particularly accurate.

Preferably the weighting function is modified at step (d) each time it is applied to the sub-band by altering the pattern of amplification and/or attenuation applied to the sub-band. Preferably, a set of M different transfer functions are predetermined such that the condition number of the resulting weighting function is minimized.

There now follows by way of example only a detailed description of the present invention with reference to the accompanying drawings in which.

Figure 1:
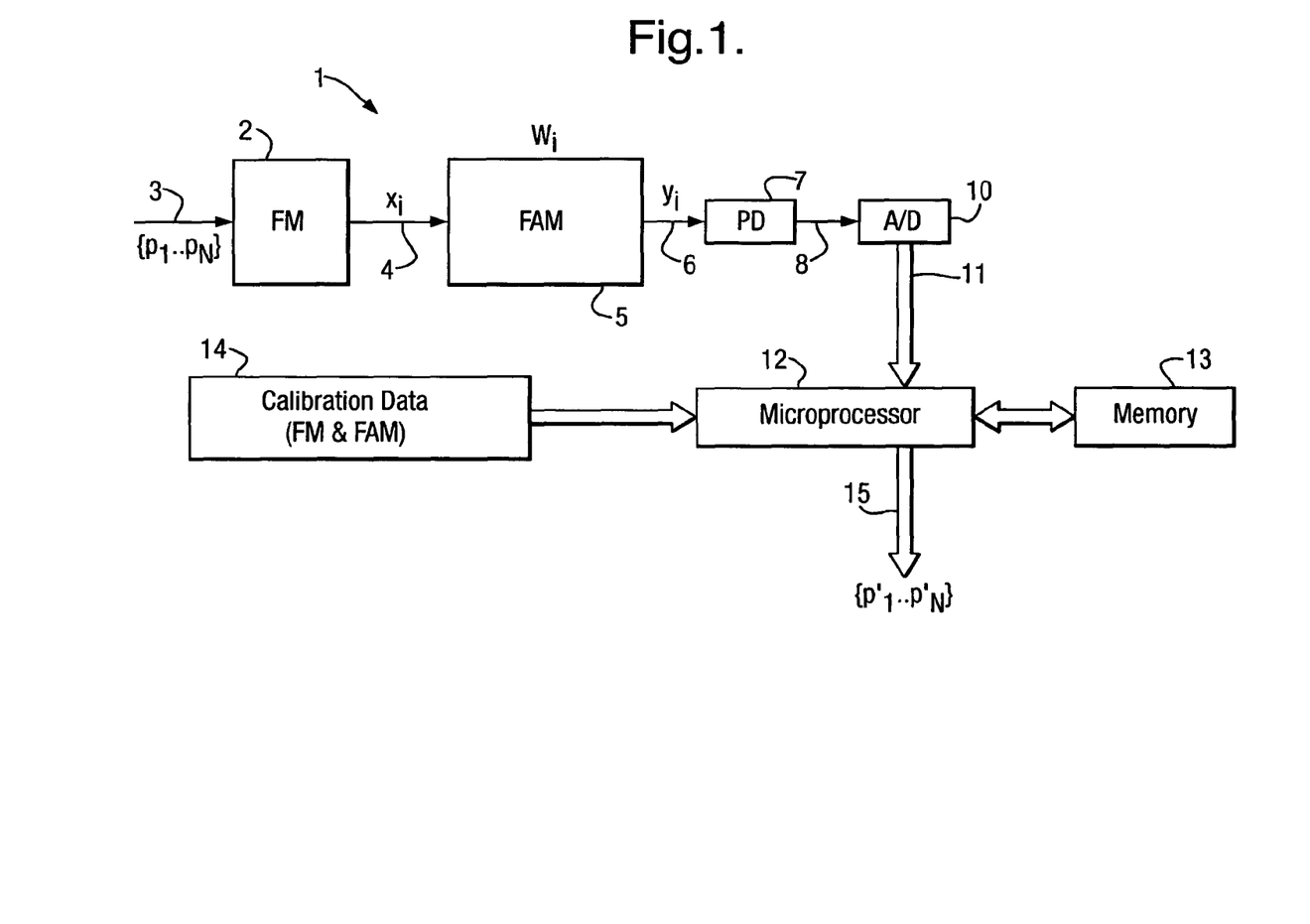
FIG. 1 shows a first embodiment of the channel power estimation means.

The channel power estimation means 1 shown in FIG. 1 is integrated into an optical amplifier card (not shown), although it may comprise a stand-alone component. The channel power estimation means 1 can be deployed across a metro CWDM (course wavelength division multiplexing) network cost-effectively.

The channel power estimation means 1 comprises a filter means 2 to receive the incoming signal 3 and output a filtered signal 4. The filtered signal 4 is received by a function application means 5, which outputs a weighted signal 6. The weighted optical signal 6 is converted to electrical form by a photodiode 7. The resulting electrical signal 8 is digitized by an analogue-to-digital converter 10. The digital signal 11 is read by reconstruction means 12. The reconstruction means 12 comprises a microprocessor that is associated with a memory 13 and is arranged to receive predetermined calibration data from a storage means 14. The microprocessor 12 is also arranged to provide an output 15 comprising an estimation of the power of the each channel in the incoming signal 3.

The incoming signal 3 comprises a wavelength division multiplexed signal having a plurality of channels. The actual optical power of each of the channels in the incoming signal 3 are designated $p_1, p_2, p_3 \ldots p_N$ for an incoming signal of N channels.

The filter means 2 comprises a band selector filter that is adapted to select a portion of the optical spectrum $x_i$. The filter means 2 is configured such that the portion of the optical spectrum selected contains some of the channels that comprise the incoming signal 3. Thus, let the band selector filter 2 output a filtered signal that contains $N_B$ channels. In practice, it has been found that the channel power estimation means is particularly accurate when approximately four channels are selected. Thus, the filter means 2 is preprogrammed during manufacture such that is substantially selects a certain number of channels in each sub-band. The band selector filter 2 allows the bandwidth of interest to be selected thus reducing the effect of optical noise on the signal originating outside the bandwidth of interest and thereby maximising the accuracy of the reconstructed power levels.

The function application means 5 comprises an optical attenuator with variable tilt that applies a weighting function $W_i$ to the signal. It will be appreciated that the function application means 5 may be any optical component whose transfer function can be changed according to some control parameter and is invertible. It will be appreciated that the function application means could be a Mach Zender interferometer in which the control variable is a electrical voltage. Another possible implementation could rely on very-highly nonlinear waveguides fed with the signal at diverse total power where Raman Scattering is exploited in order to provide the required different loss profiles. The function application means 5 applies the weighting function M times to the filtered signal 4, where M is greater or equal to the number of channels $N_B$ in the filtered signal 4. The weighting function $W_i$ exhibits M different transfer functions that constitutes a linear system that is invertible. Details of the weighting functions and M and $N_B$ are stored in the storage means 14. The weighted signal $y_i$ is output to the photodiode 7 and the analogue-to-digital convertor 10.

The microprocessor 12 stores the signals received from the analogue-to-digital convertor 10 in memory 13 and processes them using the calibration data from the storage means 14 and pre-programmed instructions. The memory 13 comprises random access memory of conventional type. The calibration data may also be stored in the random access memory 13, although in FIG. 1 it is shown stored in the storage means 14 that comprises EEPROM memory. This enables the channel power estimation means 1 to be reprogrammed when necessary.

Figure 2:
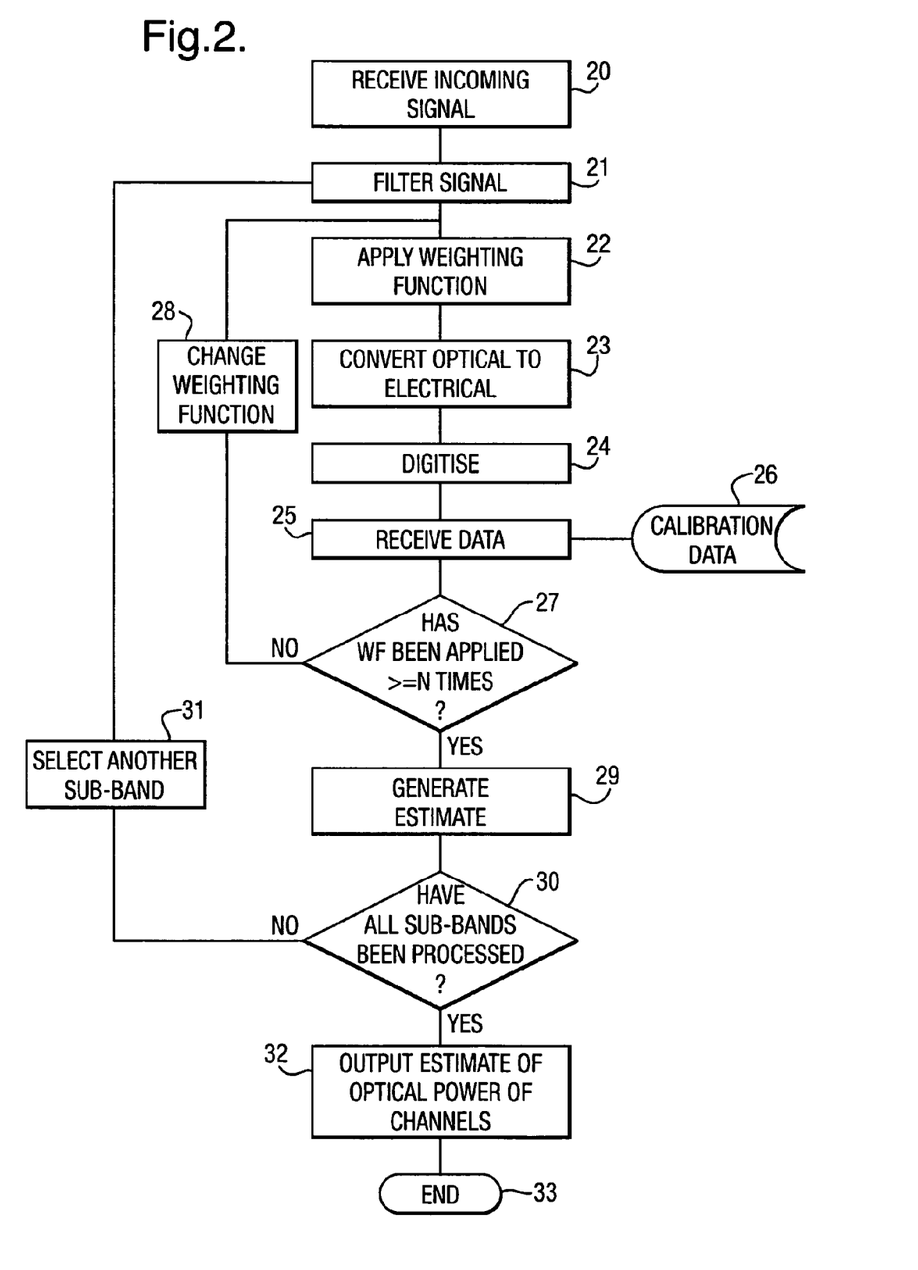
FIG. 2 shows a flow chart illustrating the method of operation of the channel power estimation means.

The operation of the channel power estimation means 1 is shown in the flow chart of FIG. 2. The incoming signal of N channels is received at step 20. The signal is then filtered at step 21 so that a sub-band $B_i$ of the signal is selected. A weighting function is then applied to the filtered signal at step 22. The weighted optical signal is then converted to an electrical signal at step 23 and converted to a digital signal at step 24 for receipt by microprocessor 12. The microprocessor 12 receives both the processed signal and calibration data 26 at step 25. At step 27, the microprocessor determines whether or not the weighting function has been applied M times wherein M is an integer greater than or equal to the number of channels $N_B$ in the sub-band $B_i$. Thus, if the weighting function has not been applied M times, the method returns to step 22 via step 28. Step 28 changes the weighting function applied to the signal by altering the control parameter. The weighting function is changed such that a different pattern of gains and losses are applied to the signal. Thus, for a certain sub-band a set of M different weighting functions are applied according to the M values of the control parameter chosen such that the condition number of the resulting overall weighting function is minimized and invertible in a strict sense or a least-squares sense. The changed weighting function is then applied, the signal converted to an electrical signal at step 23, digitized at step 24 and received by the microprocessor 12 at step 25. M is predetermined and is chosen such that the calculations performed by the microprocessor 12 are kept as simple as possible while ensuring that the channel power estimation means 1 operates to a sufficiently high level of accuracy. The parameter M is predetermined by evaluating it numerically and then storing it in the memory 14.

Once the weighting function has been determined to have been applied M times, the method proceeds to step 29. At step 29 the microprocessor 12 performs a series of mathematical manipulations of the data stored in memory 13, as described below. In summary, each of the M weighted signals received at step 25 is multiplied by an inverse matrix of the weighting function. At step 30, it is determined whether or not all of the sub-bands of the incoming signal 3 have been processed. If not, the method returns to step 21 via step 31 in which the filter means 2 is instructed to select the next sub-band $B_{i+1}$ from the incoming signal 3. The microprocessor 12 is arranged to select each sub-band from low wavelengths to higher wavelengths, although the order is not critical. Once all of the sub-band of the signal 3 have been processed the method proceeds to step 32. At step 32 an estimate of the original channel power $p'_1, p'_2, p'_3 \ldots p'_N$ is output for each channel in the incoming signal i.e. the data calculated at step 29 is compiled to form an output 15 from the microprocessor 12. The method then ends at step 33. The method may then either start again or wait for an instruction to start again.

The incoming signal 3 is made of WDM channels characterised by a spectral power density x that is a function of wavelength. Let $B_i$ be one of the K sub-bands belonging to the transmission band B (e.g. C or L) that contains the incoming signal. The sub-band $B_i$ is selected from the incoming signal 3 by the filter means 2 (i.e. 5 channels out of 40, for example). Thus, $B_1$ will contain a first group of channels, $B_2$ a second group of channels to $B_K$ which contains the final group of channels. It will be appreciated that the groups of channels may overlap in that $B_2$ may include some of the channels in group $B_1$, for example.

$$B_i \subseteq B_{C+L}$$

The detected optical power $y_j$ of the sub-band $B_i$:

$$y_j = \int_{B_i} x(\lambda) w_j(\lambda) d\lambda \qquad (1)$$

wherein $x(\lambda)$ is the power spectral density of the sub-band $B_i$.

When the signal-to-noise ratio is reasonably high, the following holds:

$$x(\lambda) \cong \sum_k p_k \delta(\lambda - \lambda_k) \qquad (2)$$

wherein $p_k$ is the optical power of the channel k in the transmission sub-band $B_i$ of interest and $\delta$ is a suitable function that;
 a) models the channel power spectral and
 b) takes into account channel stability.

In its simplest form $\delta$ is the Dirac delta function. Other functions can be devised as discussed below and only impact the definition of coefficients $w_j$ in equation 1.

The measurement $y_j$ is compactly described by combining equations 1 and 2 as:

$$y_j \cong \int_{B_i} \sum_k p_k \delta(\lambda - \lambda_k) w_j(\lambda) d\lambda = \sum_k w_{jk} p_k \qquad (3)$$

$w_{jk}$ is the value of the j-th weighting function at channel k.

$$w_{jk} = \int_{B_i} w_j(\lambda) \delta(\lambda - \lambda_k) d\lambda \qquad (4)$$

Equation 3 can be rewritten in matrix form:

$$y = W \cdot p \qquad (5)$$

The above equation can be then solved by means of the calibration data stored in the storage means 14 of the channel power estimation means 1. When M is equal to N, the solution is:

$$p = W^{-1} \cdot y \qquad (6)$$

And when M is greater than N the equation can be solved using least-square analysis as known in the art, although this increases the acquisition time:

$$p = (W^T W)^{-1} W^T \cdot y = W^+ y \qquad (7)$$

Computation time, however, is not increased because $W^+$ coefficients represent the effect of the filter means 2 and function application means 5 and these are predetermined during initial calibration and are stored in storage means 14.

The weighting function $w_{ik}$ taken from equation 2 reduces to the following if it is assumed that channel power $\delta$ can be approximated as the Dirac's delta function.

$$w_{ik} = \frac{T_{max}}{(N-1)^2}(N - 2 \cdot i + 1) \cdot \left(k - \frac{N+1}{2}\right) \qquad (8)$$

wherein $T_{max}$ is the maximum peak-to peak tilt provided by the optical attenuator 5, N is the number of channels contained in the incoming signal, i is the weighting function index and k is the channel index.

Alternatively, it will be appreciated that $\delta$ could be a first-order Gaussian function as set out below;

$$\delta(\lambda_j) = e^{-\ln(2)\left(\frac{\lambda - \lambda_j}{FWHM/2}\right)^2} \qquad (9)$$

Whether either the dirac delta function is used to model the channel power or the first-order Gaussian function, the matrix $w_{ik}$ is programmed with the appropriate values to enable an estimation of the channel power to be extracted from the incoming signal.

Thus, due to the nature of WDM signals we can approximate the sub-band spectral signal as a sum of Dirac impulses (if equation 8 is used) or Gaussian impulses (if equation 9 is used) multiplied by the channel powers. The weighting function is a continuous function of wavelength as well. The matrix used by the microprocessor 12 that models the filter means 2 and function application means 5 is obtained by solving equation 4 numerically. The matrix used by the microprocessor 12 is predetermined during manufacture.

After the set of M measurements, y is obtained and the microprocessor 12 multiplies them by proper inverse weighting matrix to obtain x. This matrix is $W^{-1}$ if M=N and is $W^+$ if M>N. Thus, the microprocessor 12 stores the M measurements related to a certain sub-band $B_i$ and they are then multiplied by the inverse weighting matrix to estimate the power of the channels of that sub-band. Thus, at step 29, the microprocessor 12 uses M values of y and the inverse matrix to estimate the power of each channel in the sub-band $B_i$. These estimates are stored in memory 13 and once sub-bands $B_1$ to $B_K$ have been processed the microprocessor 12 outputs the estimates of the power of each channel $p'_1, p'_2, p'_3 \ldots p'_N$.

Figure 3:
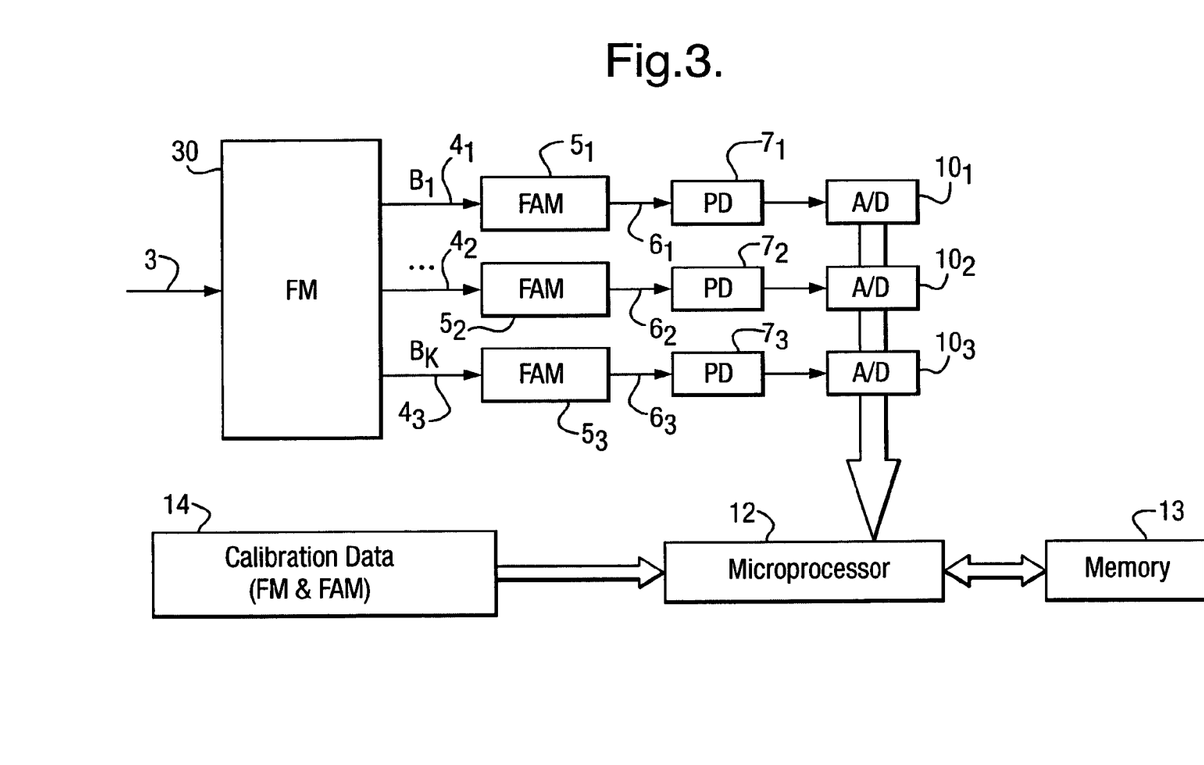
FIG. 3 shows a second embodiment of the channel power estimation means.

FIG. 3 shows a second embodiment of the channel power estimation means 1. This embodiment is substantially similar to the first embodiment and the same reference numerals have been used for like features. In this embodiment a multi-port filter means 30 is used that has a plurality of output ports. Each output port outputs one of the required sub-bands $B_1$, $B_2 \ldots B_k$ that are extracted from the incoming signal 3. Each output port of the filter means 2 is coupled with a separate function application means $\mathbf{5}_1, \mathbf{5}_2 \ldots \mathbf{5}_k$ which is then coupled to a respective photodiode $\mathbf{7}_1, \mathbf{7}_2 \ldots \mathbf{7}_k$ and respective analogue-to-digital convertor $\mathbf{10}_1, \mathbf{10}_2 \ldots \mathbf{10}_k$. The microprocessor 12 receives digital signals from each of the analogue-to-digital converters $\mathbf{10}_1, \mathbf{10}_2 \ldots \mathbf{10}_k$ and processes the results as described in relation to the previous embodiment.

Figure 4:
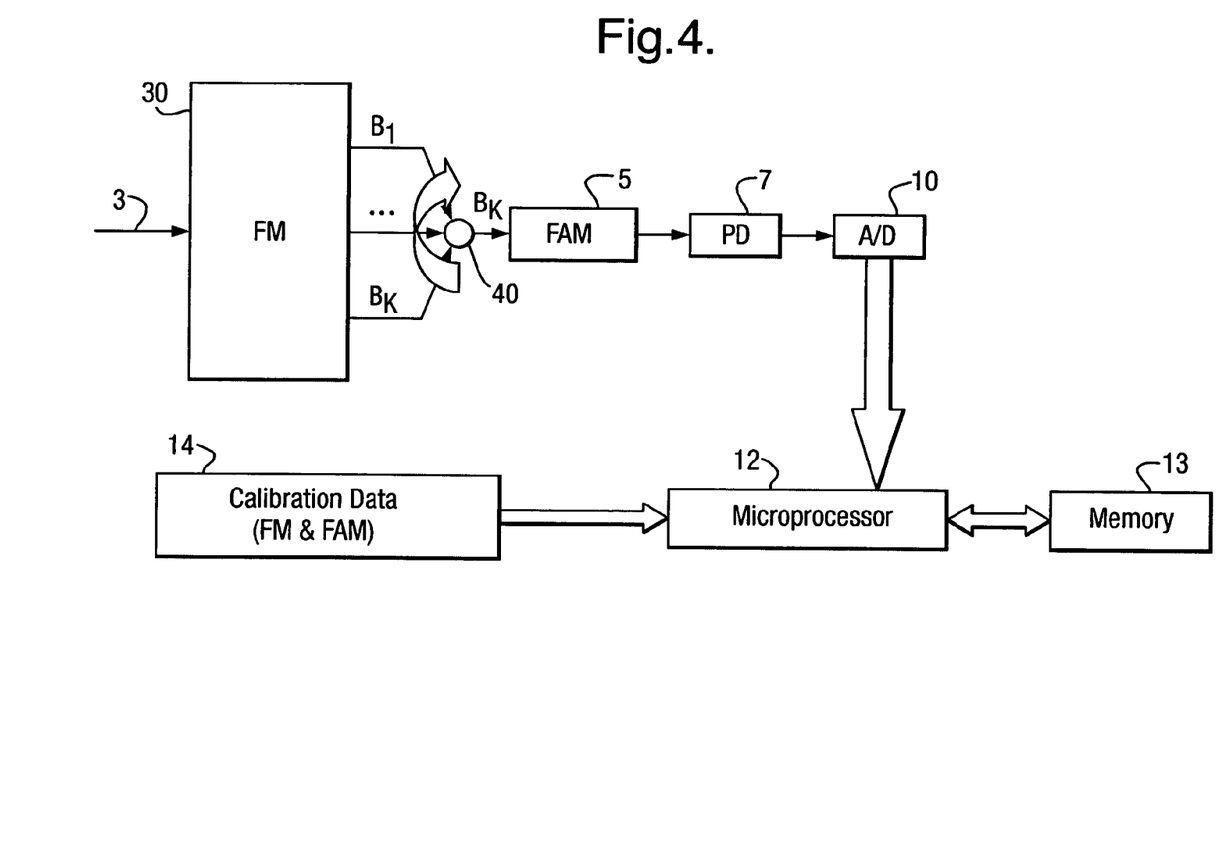
FIG. 4 shows a third embodiment of the channel power estimation means.

FIG. 4 shows a third embodiment which is similar to the previous two embodiments and like reference numerals have been used for like features. In this embodiment, the multi-port filter means 30 is retained although the outputs are fed to a single function application means 5 via a optical switch 40 that transfers the optical signal at one of its inputs to its output and is controlled by the microprocessor 12 to access each of the sub-bands in turn. The remainder of the third embodiment is identical to the first embodiment.

Figure 5:
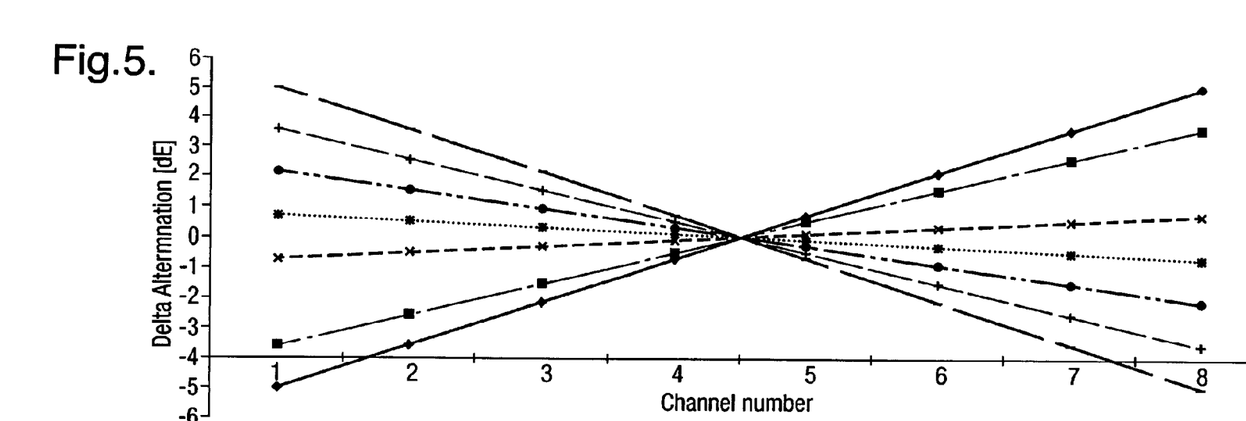
FIG. 5 shows a graph of attenuation vs. channel number for how the weighting function could be implemented by means of a variable tilt optical attenuator.

FIG. 5 shows a graph of the delta attenuation in decibels vs. channel number of the optical attenuator that forms an example of the function application means 5. Each plot represents the optical attenuation at a certain channel number for a certain value of the control parameter of the optical attenuator. The control parameter for the optical attenuator may be application of a certain voltage, temperature, current or mechanical stress, for example. As can be seen in FIG. 5, the peak-to-peak tilt provided by this optical component ranges from 10 dB over an eight channel bandwidth to −10 dB.

As discussed above, when M is equal to N, the optical tilting attenuator implements Equation 6. An example of the $W^{-1}$ matrix is shown below.

| 15.8 | 10.6 | 6.3 | 2.1 | −2.1 | −6.3 | −10.6 | −14.8 |
|---|---|---|---|---|---|---|---|
| 10.6 | 8.6 | 4.5 | 1.5 | −1.5 | −4.5 | −7.6 | −10.6 |
| 6.3 | 4.5 | 3.7 | 0.9 | −0.9 | −2.7 | −4.5 | −6.3 |
| 2.1 | 1.5 | 0.9 | 1.3 | −0.3 | −0.9 | −1.5 | −2.1 |
| −2.1 | −1.5 | −0.9 | −0.3 | 1.3 | 0.9 | 1.5 | 2.1 |
| −6.3 | −4.5 | −2.7 | −0.9 | 0.9 | 3.7 | 4.5 | 6.3 |
| −10.6 | −7.6 | −4.5 | −1.5 | 1.5 | 4.5 | 8.6 | 10.6 |
| −14.8 | −10.6 | −6.3 | −2.1 | 2.1 | 6.3 | 10.6 | 15.8 |

This table shows the calibration data matrix when the described variable optical attenuator is used as the function application means. For simplicity, this matrix neglects and effect on the signal caused by the band selector filter 2.

It will be appreciated that it is not essential that the tilting optical attenuator provides a linear attenuation slope, but only that the resulting weighting function is invertible and the loss of accuracy is acceptable, e.g. 2 digits. The loss of accuracy can be minimized by analysing the effect of the filter and the weighting function application means, because by knowing the actual optical weighting function the appropriate sub-band size can be selected that will yield the most accurate results. This can be preprogrammed once the optical components that comprise the filter means and function application means have been selected.

Figure 6:
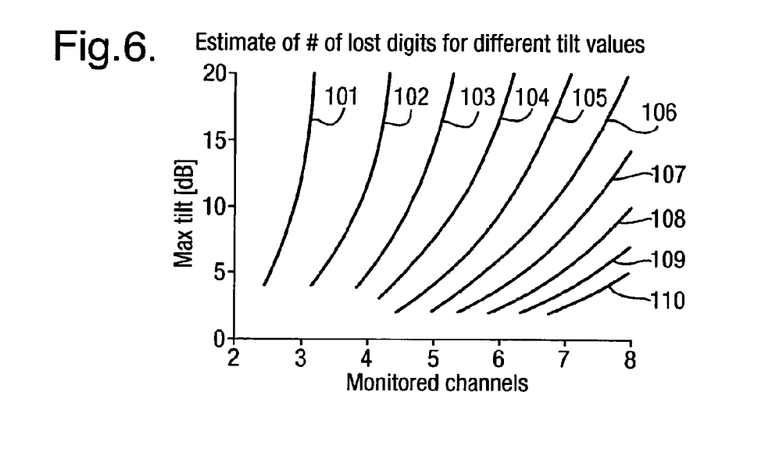
FIG. 6 shows a graph of the number of significant digits lost in accuracy to following the application of both filter means and weighting function.

FIG. 6 shows the number of significant digits lost in accuracy for a given number of channels in a WDM signal and the maximum tilt of an optical attenuator. In particular, the graph shows ten curves each representing a number of significant digits lost in accuracy from one digit to 10 digits. Curve 101 represents a single significant digit being lost in the estimation of the channel power. Curve 102 represents two digits of accuracy being lost. Curve 103 represents three digits of accuracy being lost. Curve 104 represents four digits of accuracy being lost. Curve 105 represents five digits of accuracy being lost. Curve 106 represents six digits of accuracy being lost. Curve 107 represents seven digits of accuracy being lost. Curve 108 represents eight digits of accuracy being lost. Curve 109 represents nine digits of accuracy being lost. Curve 110 represents ten digits of accuracy being lost. The x axis shows the number of channels to be reconstructed and the y axis is the maximum tilt of the weighting function application means. The sub-band channels x are reconstructed from a set of optical powers y. Like all real-world measurements, y will be characterized by a certain accuracy represented by a number of significant digits. There are several sources of uncertainty, for example quantization of the signal. The designer of the present invention therefore needs to take account of the graph of FIG. 6 when selecting the optical components that make up the filter means 2 and function application means 5. Thus, we want the number of digits lost in the computation process to be less than a certain amount, otherwise the reconstructed channel powers are not practically useful. For example, if we consider a variable-tilt attenuator with a maximum tilt of +/−10 dB and an input WDM signal comprising 4 channels, a lost of accuracy of slightly more than 2 digits is obtained i.e. with reference to curve 102. This level of accuracy is typically acceptable. However, for the same optical component, when used with an eight channel WDM signal, a lost of accuracy of 8 digits (curve 108) is experienced. This would typically result in an unreliable reconstructed signal. Therefore, the number of channels selected by the filter means in the sub-band $B_i$ is important to ensure the signal power can be reconstructed with a sufficient degree of accuracy.

The invention claimed is:

1. A channel power estimator for estimating the power of each channel in a wavelength division multiplexed (WDM) signal, comprising:
   a filter adapted to select and output a sub-band having a sub-set of the channels of an incoming WDM signal;
   a function application device adapted to apply a weighting function to the output from the filter;
   a reconstruction processor arranged to receive the weighted signal and adapted to control the function application device to apply the weighting function a predetermined number of times to the selected sub-band, and to modify the weighting function for each said application; and
   a storage memory arranged to store optical characteristic data on at least the function application device;
   wherein the reconstruction processor is arranged to calculate an estimation of the power distribution of the incoming WDM signal using the weighted signal and the optical characteristic data,
   wherein the predetermined number of times is M times wherein M is greater or equal to the number of channels N contained in the sub-band.

2. A channel power estimator according to claim 1, in which the filter comprises an optical filter and in which the function application device comprises an optical attenuator with variable tilt.

3. A channel power estimator according to claim 1, in which the filter is adapted to select a different sub-band of the incoming signal after the initially selected sub-band.

4. A channel power estimator according to claim 1, in which the filter is arranged to select and output different sub-bands of the incoming signal simultaneously.

5. A channel power estimator according to claim 1, in which the weighting function is changed each time it is applied to the sub-band such that a different pattern of amplification and/or attenuation is applied to the sub-band.

6. A channel power estimator according to claim 5, in which the different weighting functions are chosen such that the condition number of the resulting weighting function is minimized.

7. A channel power estimator according to claim 1, in which the channel power estimator includes a photodiode that is arranged to receive the optical signal from the function application device and is adapted to convert it to an electrical signal for receipt by an analogue-to-digital convertor arranged between the photodiode and the reconstruction processor.

8. A channel power estimator according to claim 1, in which the optical characteristic data also incorporates details of the effect of the filter on the incoming signal.

9. A channel power estimator according to claim 1, in which the reconstruction processor is arranged to multiply each of the measured weighted signals by an inverse matrix of the weighting function.

10. A method for estimating the power of each channel in an incoming wavelength division multiplexed (WDM) signal, the method comprising the steps of:
    (a) selecting a sub-band from the incoming signal;
    (b) applying a weighting function to the selected sub-band to generate a weighted signal;
    (c) measuring the power of the weighted signal;
    (d) modifying the weighting function and then repeating steps (b) and (c) until the weighting functions have been applied a predetermined number of times;
    (e) calculating an estimation of the power distribution of the sub-band using the measurements of the weighted signal and details of the weighting function; and
    (f) selecting a different sub-band from the incoming signal and repeating steps (b) and (c) until all of the sub-bands of the incoming signal have been selected,
    wherein the predetermined number of times is M times wherein M is greater or equal to the number of channels N contained in the sub-band.

11. A method for estimating the power distribution of an incoming WDM signal according to claim 10, the method including a step (g) involving compiling the estimation of the power distribution of each sub-band and outputting a signal indicative of the power of each channel in the incoming signal.

12. A method for estimating the power distribution of an incoming WDM signal according to claim 10, in which the weighting function is applied to the sub-band $N_B$ times where $N_B$ is the number of channels contained in the sub-band.

13. A method for estimating the power distribution of an incoming WDM signal according to claim 10, in which step (e) involves multiplying each of the measured weighted signals by an inverse matrix of the weighting function.

14. A method for estimating the power distribution of an incoming WDM signal according to claim 10, in which a set of M different transfer functions are predetermined such that the condition number of the resulting weighting function is minimized.

* * * * *